US012808502B2

(12) United States Patent
Mattingly

(10) Patent No.: US 12,808,502 B2
(45) **Date of Patent: *Nov. 24, 2026**

(54) DEPLOYABLE-BASE LIGHT FIXTURES AND RELATED METHODS

(71) Applicant: MATTINGLY LOW VISION, INC., El Paso, TX (US)

(72) Inventor: Sean Mattingly, El Paso, TX (US)

(73) Assignee: MATTINGLY LOW VISION, INC., El Paso, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/370,179

(22) Filed: Oct. 27, 2025

(65) Prior Publication Data

US 2026/0146720 A1 May 28, 2026

Related U.S. Application Data

(63) Continuation of application No. 18/064,723, filed on Dec. 12, 2022, now Pat. No. 12,455,053.

(Continued)

(51) Int. Cl.

| | |
|---|---|
| ***F21S 6/00*** | (2006.01) |
| ***F21V 17/00*** | (2006.01) |
| ***F21V 17/10*** | (2006.01) |
| ***F21V 21/06*** | (2006.01) |
| ***F21V 21/26*** | (2006.01) |

(52) U.S. Cl.

CPC .............. *F21S 6/005* (2013.01); *F21V 21/06* (2013.01); *F21V 21/26* (2013.01); *F21S 6/006* (2013.01); *F21V 17/007* (2013.01); *F21V 17/107* (2013.01)

(58) Field of Classification Search

CPC ......... F21V 21/26; F21V 21/06; F21V 17/107

See application file for complete search history.

(56) References Cited

U.S. PATENT DOCUMENTS 2,466,556 A * 4/1949 Picken .................... D06F 81/02 108/123

2,689,158 A 9/1954 Mahr (Continued)

FOREIGN PATENT DOCUMENTS

| | | |
|---|---|---|
| CN | 201141572 | 10/2008 |
| CN | 201416857 | 3/2010 |

(Continued)

*Primary Examiner* — Eric T Eide

(74) *Attorney, Agent, or Firm* — Norton Rose Fulbright US LLP

(57) ABSTRACT

Some of the disclosed fixtures include a base defining a plane and an elongated arm having a first end that is pivotally coupled to the base via a hinge such that the arm is movable relative to the base between stowed and deployed positions in which the first end of the arm is substantially parallel and substantially perpendicular, respectively, to the plane, and a second end that is couplable to a light source. In some fixtures, movement of the arm to the deployed position moves or enables movement of the hinge to an engaged position in which the hinge prevents movement of the arm from the deployed position toward the stowed position via contacting hinge bearing surfaces. In some fixtures, only when the arm is in the deployed position, the hinge is in or movable to an engaged position that prevents movement of the arm from the deployed position.

17 Claims, 4 Drawing Sheets

Related U.S. Application Data

(60) Provisional application No. 63/288,175, filed on Dec. 10, 2021.

(56) References Cited

U.S. PATENT DOCUMENTS

| | | | | |
|---|---|---|---|---|
| 3,563,592 | A * | 2/1971 | Preston | E05C 17/32 217/60 E |
| 4,314,319 | A | 2/1982 | Terry et al. | |
| 4,718,624 | A * | 1/1988 | Greulich | H04R 1/08 248/291.1 |
| 4,796,172 | A | 1/1989 | Chestnut | |
| 4,847,740 | A | 7/1989 | Laske | |
| 5,865,128 | A | 2/1999 | Tarnay | |
| 6,467,936 | B1 | 10/2002 | Golemba | |
| 6,971,321 | B1 * | 12/2005 | Strong | A47B 3/0912 248/439 |
| 8,550,012 | B2 * | 10/2013 | Rogers | A47B 3/0916 108/131 |
| 9,182,108 | B2 * | 11/2015 | Hsieh | F21V 17/007 |
| 10,485,333 | B1 | 11/2019 | Tar | |
| 11,191,351 | B2 | 12/2021 | Scholander | |
| 2007/0242468 | A1 * | 10/2007 | Leung | F21S 6/003 362/410 |
| 2010/0206465 | A1 | 8/2010 | Fossey, Jr. et al. | |
| 2011/0140640 | A1 | 6/2011 | Lu et al. | |
| 2014/0169007 | A1 | 6/2014 | Polick et al. | |
| 2018/0058647 | A1 | 3/2018 | He et al. | |
| 2018/0195702 | A1 | 7/2018 | Yen et al. | |
| 2018/0224101 | A1 | 8/2018 | Qiu | |
| 2020/0349816 | A1 | 11/2020 | Menschik et al. | |
| 2023/0226410 | A1 | 7/2023 | Yoo et al. | |

FOREIGN PATENT DOCUMENTS

| | | |
|---|---|---|
| CN | 112097154 | 12/2020 |
| EP | 1044630 | 10/2000 |
| EP | 2336015 | 6/2011 |
| KR | 920011027 U | 7/1992 |

* cited by examiner

DEPLOYABLE-BASE LIGHT FIXTURES AND RELATED METHODS

This application is a continuation of U.S. Non-Provisional patent application Ser. No. 18/064,723, filed Dec. 12, 2022, which claims priority to U.S. Provisional Patent Application Ser. No. 63/288,175, filed Dec. 10, 2021, which are incorporated herein in their entirety.

FIELD OF INVENTION

The present invention relates generally to light fixtures, and more specifically but without limitation, to adjustable floor lamps for use by vision-impaired individuals.

BACKGROUND

A typical light fixture comes with a base that stabilizes the fixture against tipping, and the base is accordingly often relatively heavy and/or large. This is particularly true for light fixtures that may be at an increased risk for tipping, whether structurally, such as relatively tall floor lamps, fixtures that are adjustable in ways that give rise to tipping moments, and/or the like, and/or environmentally, such as fixtures for use by impaired (e.g., vision-impaired) individuals, the elderly, children, and/or the like.

Due at least in part to packaging constraints, such fixtures are often shipped with the base separate from the remainder of the fixture so that the fixture must be assembled before use. This typically involves positioning the heavy and/or large base relative to the remainder of the fixture and attaching the two, usually via fasteners. But this can be problematic, especially when the intended user is both impaired and the assembler.

SUMMARY

Some of the present light fixtures address these issues by including a base and a light-source-carrying arm that is coupled to the base via a hinge and is movable relative to the base between a stowed position in which the arm is substantially parallel to the base and a deployed position in which the arm is substantially perpendicular to the base, wherein movement of the arm to the deployed position moves, or enables movement of, the hinge to an engaged position that prevents movement of the arm toward, and in some instances away from, the stowed position. In this way, for example, the fixture may be shipped with the base attached to the arm in the stowed position and readily moved by a user to the deployed position in order to use the fixture. In some such fixtures, the hinge is only in or movable to the engaged position when the arm is in the deployed position, further simplifying use of the fixture.

Some of the present light fixtures comprise: a base including a bottom surface that lies in a plane and an elongated arm having a first end that is pivotally coupled to the base via a hinge such that the arm is movable relative to the base between a stowed position in which the first end of the arm is substantially parallel to the plane and a deployed position in which the first end of the arm is substantially perpendicular to the plane, and a second end that is configured to be coupled to a light source. In some fixtures, movement of the arm to the deployed position moves the hinge, or enables movement of the hinge, to an engaged position in which the hinge prevents movement of the arm from the deployed position toward the stowed position via bearing surfaces of the hinge contacting one another, and from a disengaged position in which the bearing surfaces do not contact one another. In some fixtures, when the arm is in the deployed position and the hinge is in the engaged position, the hinge prevents movement of the arm from the deployed position and away from the stowed position. In some fixtures, only when the arm is in the deployed position, the hinge is in or is movable to an engaged position that prevents movement of the arm toward or away from the stowed position.

In some fixtures, the hinge comprises a linkage that is coupled between the base and the first end of the arm, the linkage including a first link having a first end pivotally coupled to the base and a second end defining a first one of the bearing surfaces, and a second link having a first end pivotally coupled to the second end of the first link, the first end of the second link defining a second one of the bearing surfaces, and a second end pivotally coupled to the first end of the arm. In some fixtures, when the arm is in the deployed position, the pivot point between the first and second links is disposed above a line that extends between the pivot point between the first link and the base and the pivot point between the second link and the first end of the arm. In some fixtures, a distance from the pivot point between the first link and the base to the pivot point between the first and second links is greater than a distance between the pivot point between the first and second links and the pivot point between the second link and the arm. In some fixtures, when the arm is in the stowed position, the first and second links are each substantially parallel to the plane.

In some fixtures, the arm has a length, measured between the first and second ends of the arm, that is from 40 to 50 inches. In some fixtures, the base has a weight that is from 10 to 15 pounds. In some fixtures, the base has a maximum transverse dimension that is from 10 to 15 inches. Some fixtures comprise a second arm having a first end that is pivotally coupled to the second end of the first arm and a second end that is configured to be coupled to the light source.

Some of the present methods for positioning a light fixture comprise: moving an elongated arm of a light fixture having a first end that is pivotally coupled via a hinge to a base of the light fixture and a second end that is configured to be coupled to a light source from a stowed position in which the first end of the arm is substantially parallel to a plane defined by a bottom surface of the base and to a deployed position in which the first end of the arm is substantially perpendicular to the plane, and moving the hinge to an engaged position in which the hinge prevents movement of the arm from the deployed position and toward the stowed position via bearing surfaces of the hinge contacting one another and from a disengaged position in which the bearing surfaces do not contact one another. In some methods, movement of the arm to the deployed position moves the hinge to the engaged position. In some methods, when the arm is in the deployed position and the hinge is in the engaged position, the hinge prevents movement of the arm from the deployed position and away from the stowed position. In some methods, the hinge is only in or movable to the engaged position when the arm is in the deployed position.

In some methods, the hinge comprises a linkage that is coupled between the base and the first end of the arm, the linkage including a first link having a first end pivotally coupled to the base and a second end defining a first one of the bearing surfaces, and a second link having a first end pivotally coupled to the second end of the first link, the first end of the second link defining a second one of the bearing surfaces, and a second end pivotally coupled to the first end of the arm. In some methods, when the arm is in the deployed position, the pivot point between the first and second links is disposed above a line that extends between the pivot point between the first link and the base and the pivot point between the second link and the arm. In some methods, a distance from the pivot point between the first link and the base and the pivot point between the first and second links is greater than a distance between the pivot point between the first and second links and the pivot point between the second link and the first end of the arm. In some methods, when the arm is in the stowed position, the first and second links are each substantially parallel to the plane.

The term “coupled” is defined as connected, although not necessarily directly, and not necessarily mechanically; two items that are “coupled” may be unitary with each other. The terms “a” and “an” are defined as one or more unless this disclosure explicitly requires otherwise. The term “substantially” is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the terms “substantially” and “approximately” may be substituted with “within [a percentage] of” what is specified, where the percentage includes 0.1, 1, 5, and 10 percent.

The terms “comprise” and any form thereof such as “comprises” and “comprising,” “have” and any form thereof such as “has” and “having,” and “include” and any form thereof such as “includes” and “including,” are open-ended linking verbs. As a result, an apparatus that “comprises,” “has,” or “includes” one or more elements possesses those one or more elements, but is not limited to possessing only those one or more elements. Likewise, a method that “comprises,” “has,” or “includes” one or more steps possesses those one or more steps, but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term “consisting of” or “consisting essentially of” can be substituted for any of the open-ended linking verbs recited above, in order to change the scope of a given claim from what it would otherwise be using the open-ended linking verb.

Further, a device or system that is configured in a certain way is configured in at least that way, but it can also be configured in ways other than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The non-schematic figures are drawn to scale, meaning, for each of those figures, the sizes of the depicted elements are accurate relative to each other at least for the embodiment shown.

DETAILED DESCRIPTION

Figure 1A:
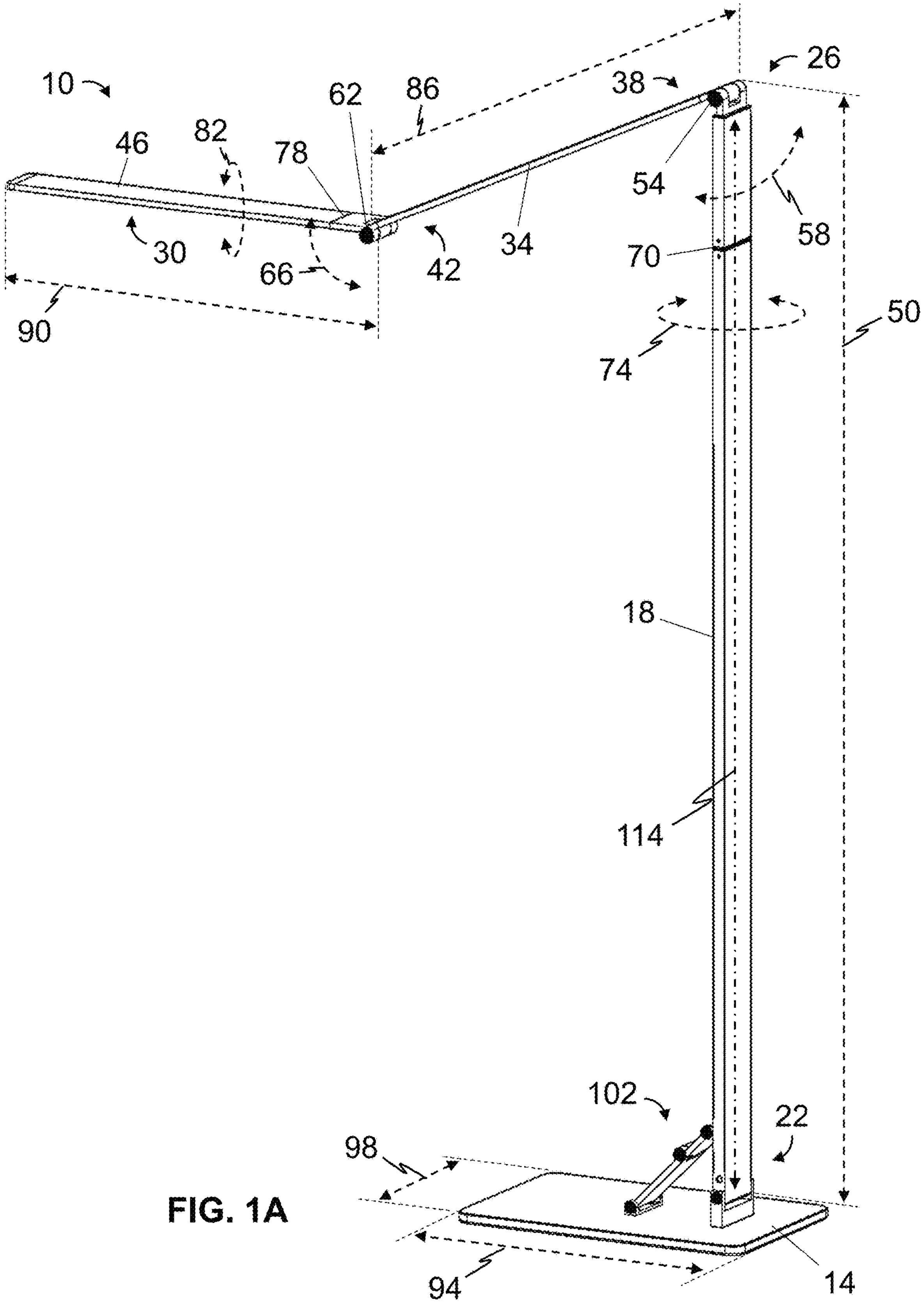
FIG. 1A is a perspective view of one of the present light fixtures that includes a light-source-carrying arm pivotally coupled to a base via a hinge, shown with the arm in a deployed position relative to the base.

Referring to FIG. 1A, shown is an embodiment 10 of the present light fixtures. Fixture 10 includes a base 14 and an arm 18 having a first end 22 that is coupled to the base and a second end 26 that is configured to be coupled to a light source 30. Light source 30 can be, for example, an LED, fluorescent, incandescent, halogen, and/or the like light source. And light source 30 can be coupled to second end 26 of arm 18 in any suitable fashion. To illustrate, fixture 10 includes a second arm 34 having a first end 38 that is pivotally coupled to second end 26 of arm 18 and a second end 42 configured to be coupled to light source 30, which can be via a third arm 46 that is pivotally coupled to the second end of the second arm.

Fixture 10 can be configured in ways that, though useful, increase the risk of the fixture tipping over. Fixture 10, for instance, can be a floor lamp. To illustrate, arm 18 can be elongated, having a length 50 measured between its first and second ends 22 and 26 that is greater than or equal to any one of, or between any two of: 40, 42, 46, 48, 50, 52, 54, 56, 58, and 60 inches. And with increasing height of arm 18, forces applied to second end 26 of the arm may cause larger tipping moments at base 14. For further example, whether or not it is a floor lamp, fixture 10 can be adjustable. To illustrate, second arm 34 can be pivoted relative to arm 18 (e.g., via a hinge 54, in a direction indicated by arrow 58), third arm 46 can be pivoted relative to the second arm (e.g., via a hinge 62, in a direction indicated by arrow 66), a portion of arm 18 can be rotated relative to another portion of arm 18 (e.g., via a hinge 70, in a direction indicated by arrow 74), a portion of the third arm can be rotated relative to another portion of the third arm (e.g., via a hinge 78, in a direction indicated by arrow 82), and/or the like. And such adjustability can be enhanced via length 86 of second arm 34, measured between its first and second ends 38 and 42, and/or length 90 of third arm 46, measured similarly to lengths 50 and 86, being greater than or equal to any one of, or between any two of: 12, 14, 16, 18, 20, 22, 24, 26, 28, 30, 32, 34, and 36 inches (e.g., approximately 17.5 inches). While this adjustability allows a user of fixture 10 to position light source 30 as desired, such positions in which the center of gravity of the fixture is laterally closer to an edge of base 14 may render the fixture more susceptible to tipping.

Fixture 10 may also be used in environments that present an increased risk of fixture-tipping. For example, fixture 10 may be used by impaired (e.g., vision-impaired) individuals, the elderly, children, and/or the like, who may be more likely to, for instance, bump into the fixture, grasp the fixture to balance themselves, misuse the fixture, and/or the like than are other individuals.

In order to mitigate the risk of fixture 10 tipping, base 14 can be relatively large and/or heavy. To illustrate, base 14 can have a weight that is greater than or equal to any one of, or between any two of: 8, 10, 12, 14, and 16 pounds. To further illustrate, base 14 can have a length 94 and/or a width 98, measured perpendicular to length 94, that is greater than or equal to any one of, or between any two of: 10, 12, 14, 16, and 20 inches. While fixture 10's base 14 is rectangular, with length 94 being larger than width 98, in other fixtures, the base can have another shape, such as square, otherwise polygonal, circular, elliptical, or otherwise rounded.

Figure 1B:
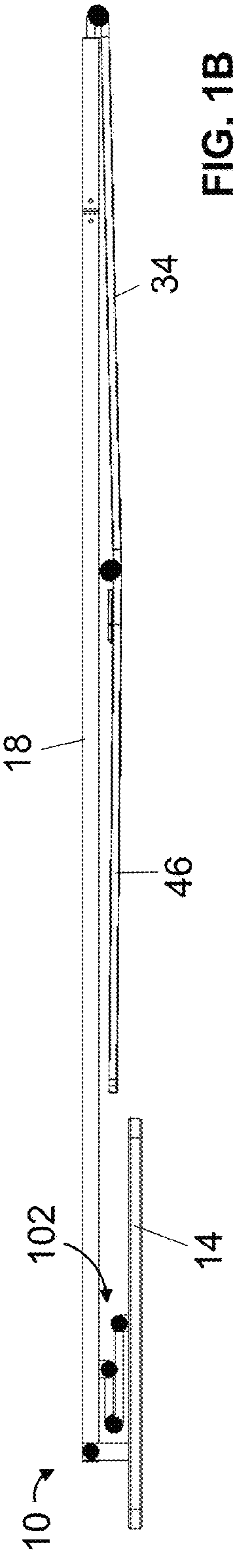
FIG. 1B is a side view of the fixture of FIG. 1A, shown with the arm in a stowed position relative to the base.
Figure 2:
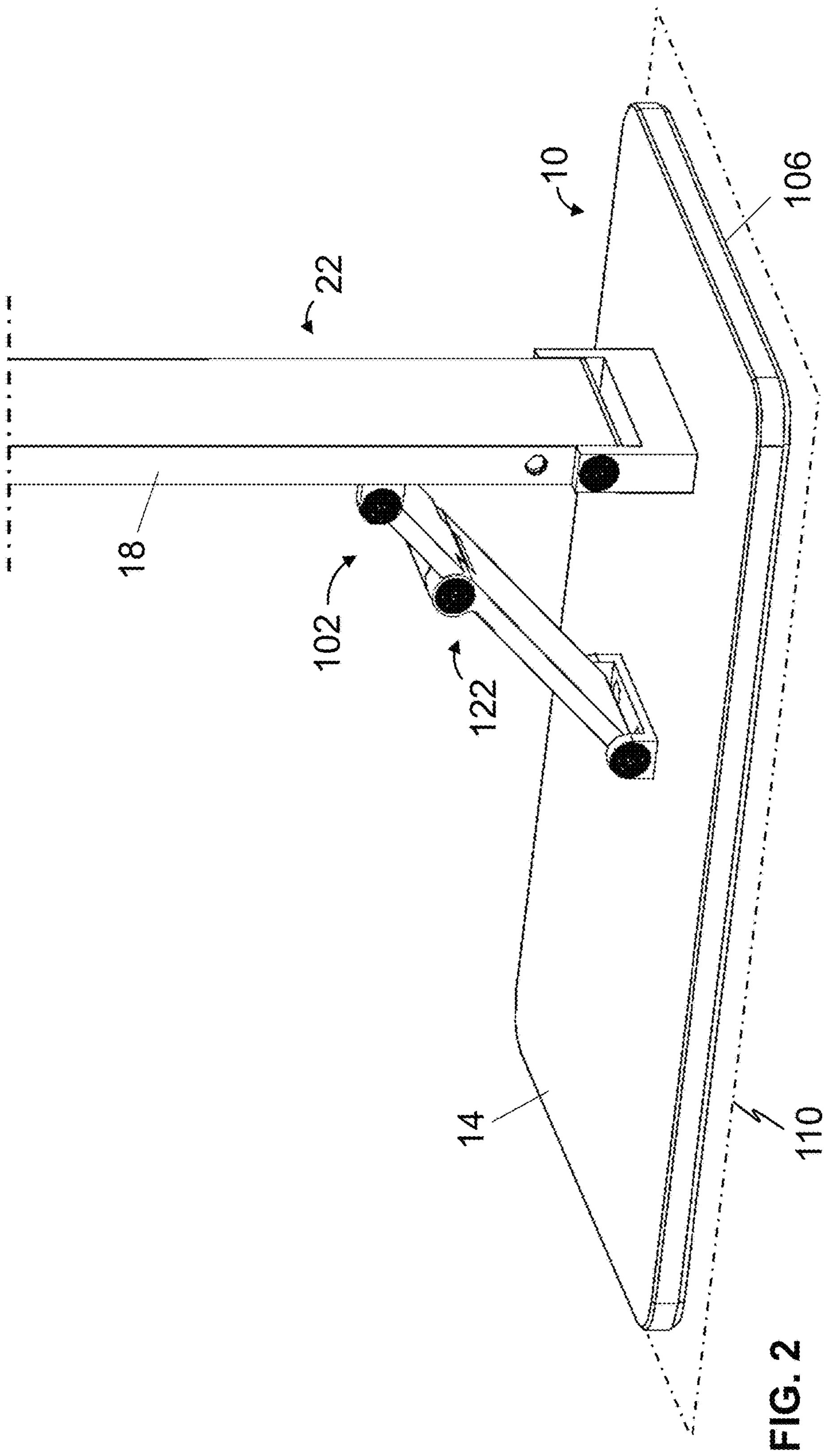
FIG. 2 is a partial perspective view of the fixture of FIG. 1A, shown with the arm in the deployed position.

Referring additionally to FIGS. 1B and 2, fixture 10 includes a hinge 102 that pivotally couples base 14 to first end 22 of arm 18 such that the arm is movable relative to the base between a stowed position (e.g., FIG. 1B) and a deployed position (e.g., FIGS. 1A and 2). In this way, for example, fixture 10 can be provided (e.g., in packaging) to a user with base 14 attached to arm 18 and the arm in the stowed position, and the user can move the arm to the deployed position to use the fixture. Such can minimize the need for user-assembly of fixture 10, particularly attachment of base 14 to arm 18 that may be especially troublesome for some (e.g., impaired) individuals. It can also reduce the size of packaging required to contain fixture 10, such as during shipping, as well as the space required to store the fixture.

Figure 3A:
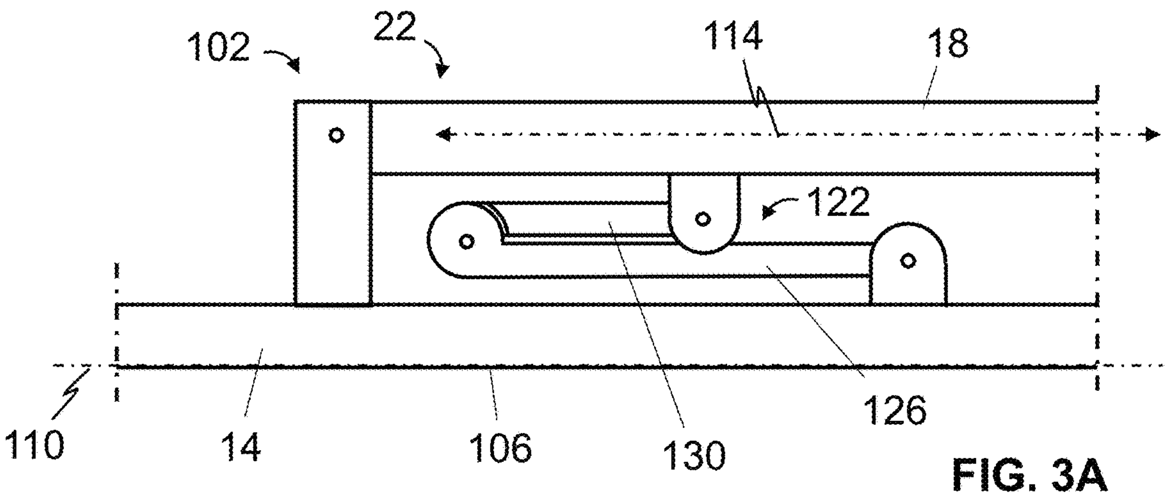
FIGS. 3A-3C are partial, schematic side views of the fixture of FIG. 1A, shown with the arm in the stowed position (FIG. 3A), the deployed position (FIG. 3C), and a position relative to the base that is between the stowed and deployed positions (FIG. 3B).
Figure 3B:
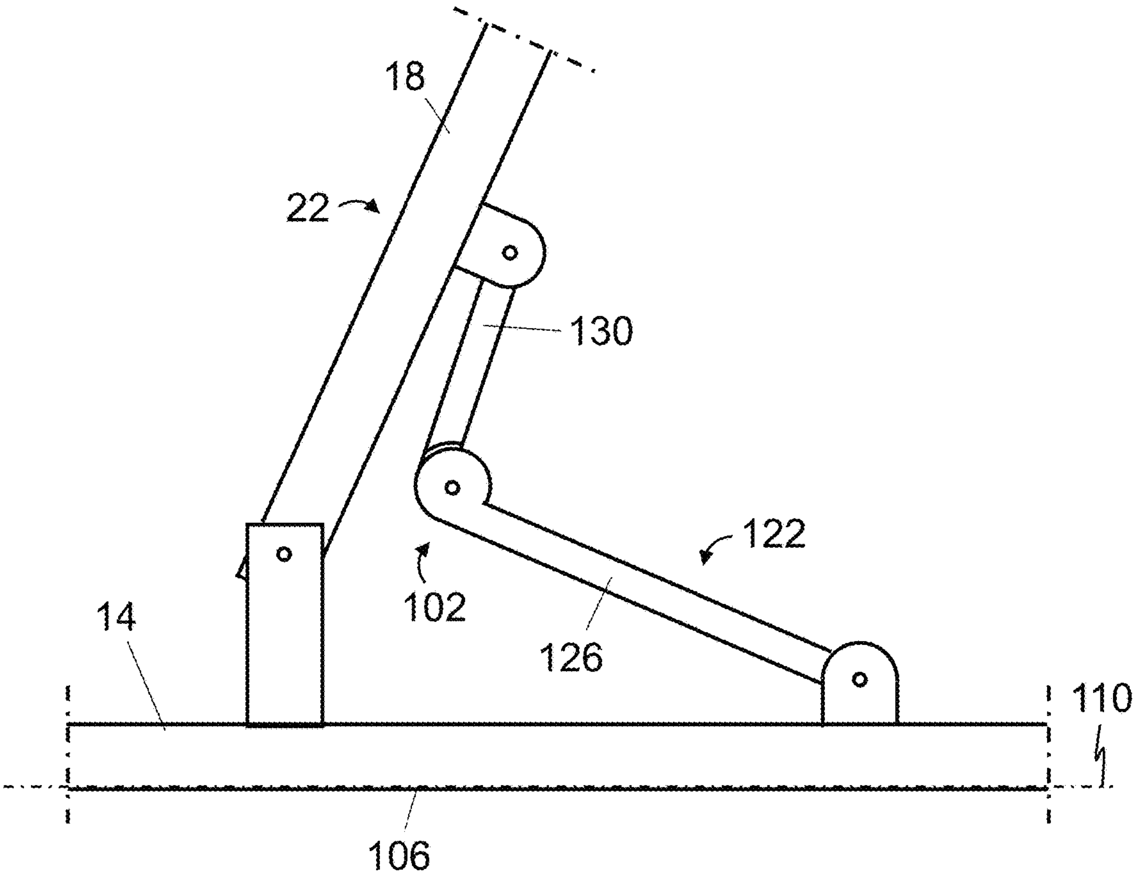
Figure 3C:
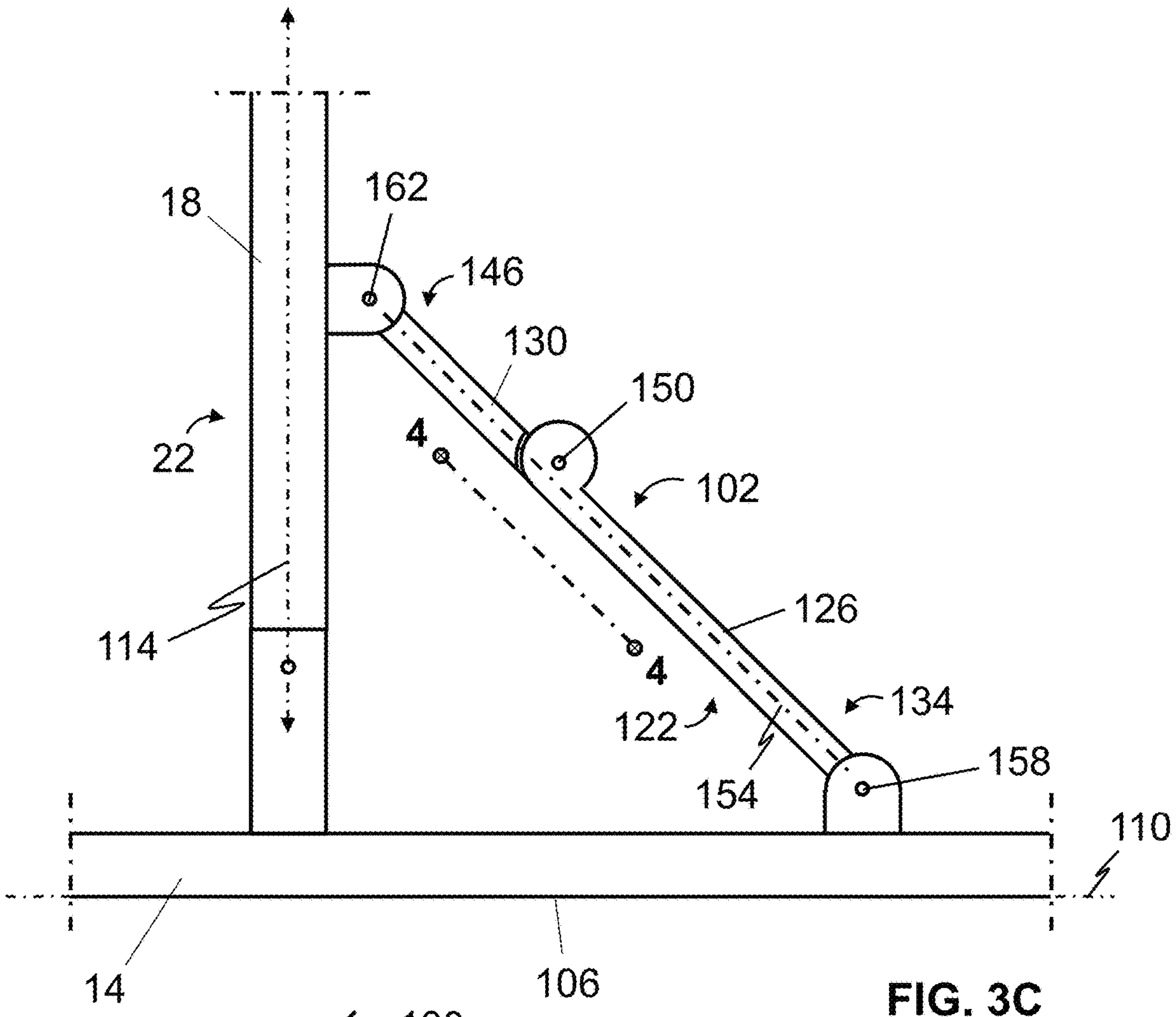

Referring additionally to FIGS. 3A-3C, when arm 18 is in the stowed position (e.g., FIG. 3A), at least first end 22 of the arm can be substantially parallel to base 14. For example, base 14 can include a bottom surface 106 that lies in a plane 110, and first end 22 of arm 18 can be substantially parallel to that plane when the arm is in the stowed position. To illustrate plane 110, when arm 18 is in the deployed position and fixture 10 is supported with base 14 resting on a horizontal surface, the plane is coincident with that horizontal surface. Bottom surface 106 lying in plane 110 does not require that all of the bottom surface lie in the plane, only that one or more portions—including spaced apart portions—of the bottom surface (e.g., defined by feet or other protrusions of base 14) lie in the plane. And first end 22 of arm 18 can be substantially parallel to plane 110 in that, for example, an axis 114 that extends between the arm's first and second ends 22 and 26 is within 15 degrees (e.g., within 10 or 5 degrees) of parallel to the plane, a distance between the arm and base 14 is substantially constant along the portion of the arm that overlies the base, and/or the like.

When arm 18 is in the deployed position (e.g., FIG. 3C), at least first end 22 of the arm can be substantially perpendicular to base 14, such as within 15 degrees (e.g., within 10 or 5 degrees) of perpendicular to plane 110, which can be determined with reference to axis 114 of the arm. To be clear, arm 18 can be in the stowed or deployed position when the arm is within the ranges described for the stowed or deployed position, respectively.

As shown in FIGS. 2 and 3C, movement of arm 18 to the deployed position can move hinge 102—or allow movement of the hinge (e.g., via a user pressing on linkage 122 to bring bearing surfaces 118*a* and 118*b* into contact with one another, described below)—to an engaged position in which the hinge prevents movement of the arm from the deployed position, at least toward the stowed position. This movement of hinge 102 to the engaged position can be from a disengaged position (e.g., FIGS. 3A and 3B) of the hinge, in which the hinge permits movement of arm 18 between the stowed and deployed positions. In some fixtures, like fixture 10, hinge 102 is only in or movable to the engaged position, and otherwise is in the disengaged position, when arm 18 is in the deployed position, which can simplify use of the fixture.

Figure 4:
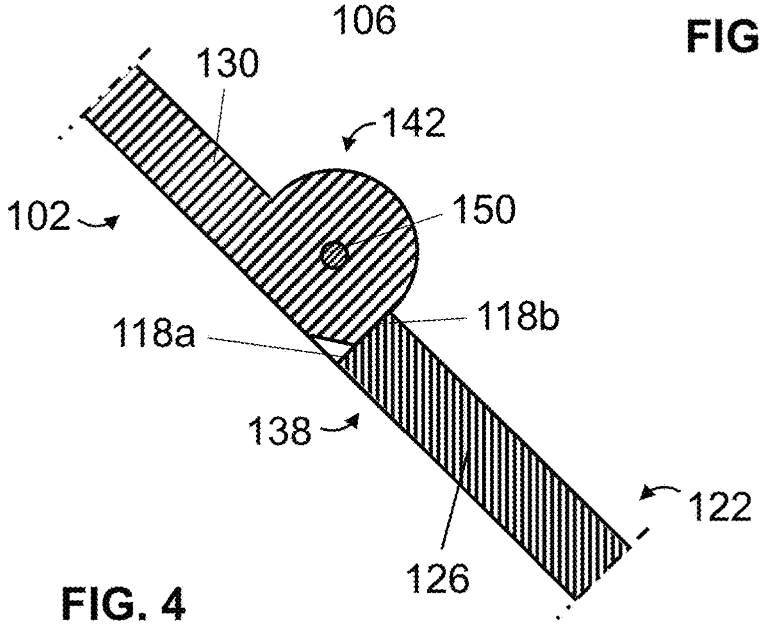
FIG. 4 is a partial, schematic, and cross-sectional side view of the hinge of the fixture of FIG. 1A, taken along line 4-4 of FIG. 3C, showing bearing surfaces of the hinge that contact one another to prevent movement of the arm from the deployed position toward the stowed position.

To illustrate with additional reference to FIG. 4, hinge 102 can include bearing surfaces (e.g., 118*a* and 118*b*) that contact one another when the hinge is in the engaged position—but not the disengaged position—to prevent movement of arm 18 from the deployed position, at least toward the stowed position. As one non-limiting example, hinge 102 can include a linkage 122 having a first link 126 and a second link 130. First link 126 can have a first end 134 that is pivotally coupled to base 14 and a second end 138 that defines a first bearing surface 118*a*. And second end 138 of first link 126 can be pivotally coupled to a first end 142 of second link 130 that defines a second bearing surface 118*b*, where a second end 146 of the second link is pivotally coupled to first end 26 of arm 18. In this configuration, as arm 18 is moved from the stowed position to the deployed position (e.g., from FIG. 3A, through FIG. 3B, and to FIG. 3C), first and second links 126 and 130 can rotate relative to one another about their pivot point 150 such that bearing surfaces 118*a* and 118*b* contact—or can be made to contact (e.g., via a user pressing on linkage 122 proximate pivot point 150)—one another. And with bearing surfaces 118 *a* and 118 *b* in contact with one another, movement of arm 18 back toward the stowed position can be prevented. While as depicted, linkage 122 (e.g., pivot point 150 thereof) moves outwardly relative to base 14 as hinge 102 moves to the engaged position (is "outwardly-moving"), in other fixtures, the linkage may instead move inwardly relative to the base during such hinge-movement (be "inwardly-moving").

The above functionality of linkage 122 can be enhanced by its geometry. To illustrate, when hinge 102 is in the engaged position, pivot point 150 between first and second links 126 and 130 can be disposed above (for an outwardly-moving linkage 122, as shown) or below (for an inwardly-moving linkage 122) a line 154 that extends from pivot point 158 between first link 126 and base 14 and to pivot point 162 between second link 130 and first end 26 of arm 18. In this way, forces acting along linkage 122 when hinge 66 is in the engaged position can tend to urge bearing surfaces 118*a* and 118*b* together and thereby maintain the hinge in the engaged position. To further illustrate, a distance between pivot points 158 and 150 can be greater than a distance between pivot points 150 and 162 (e.g., first link 126 can be longer than second link 10), which can reduce potentially hinge-moving moments at pivot point 150 created by forces that act on arm 18.

When in the engaged position, hinge 102 can also prevent movement of arm 18 from the deployed position away from the stowed position. To illustrate using fixture 10, first and second links 126 and 130 physically prevent such movement given the non-slidable, non-disengagable nature of their connections to arm 18, base 14, and each other (see FIGS. 3A-3C). In some fixtures however, including those with slidable or disengagable hinge 102—connections, movement of arm 18 from the deployed position away from the stowed position can—additionally or alternatively—be prevented by other structures, such as, for example, one or more protrusions on base 14 and/or arm 18 that contact the base, the arm, and/or one another when the arm is in the deployed position.

In fixture 10, hinge 102 can be moved from the engaged position to the disengaged position when, for example, a user desires to move or store the fixture. To illustrate, a user can press on linkage 122 proximate pivot point 150— inwardly toward base 14 and arm 18 for an outwardly-moving linkage, and outwardly away from the base and the arm for an inwardly-moving linkage—and thereby bring bearing surfaces 118*a* and 118*b* out of contact with one another. And the user can then move the arm to the stowed position. When in the stowed position, first and second links 126 and 130 can be substantially parallel to one another, facilitating, for example, arm 18's stowage in a substantially parallel relationship to base 14.

Some of the present methods for positioning a light fixture (e.g., 10) comprise moving an elongated arm (e.g., 18) of the fixture having a first end (e.g., 22) that is pivotally coupled via a hinge (e.g., 102) to a base (e.g., 14) of the light fixture and a second end (e.g., 26) that is configured to be coupled to a light source (e.g., 30) from a stowed position in which the first end of the arm is substantially parallel to a plane (e.g., 110) defined by a bottom surface (e.g., 106) of the base and to a deployed position in which the first end of the arm is substantially perpendicular to the plane. Some methods comprise moving the hinge to an engaged position in which the hinge prevents movement of the arm from the deployed position and toward the stowed position (e.g., via bearing surfaces (e.g., 118*a* and 118*b*) of the hinge contacting one another) and from a disengaged position (e.g., in which the bearing surfaces do not contact one another). In some methods, movement of the arm to the deployed position moves the hinge to the engaged position. In some methods, when the arm is in the deployed position and the hinge is in the engaged position, the hinge prevents movement of the arm from the deployed position and away from the stowed position. In some methods, the hinge is only movable to the engaged position when the arm is in the deployed position.

In some methods, the hinge comprises a linkage (e.g., 122) that is coupled between the base and the first end of the arm, the linkage including a first link (e.g., 126) having a first end (e.g., 134) pivotally coupled to the base and a second end (e.g., 138) defining a first one of the bearing surfaces (e.g., 118*a*), and a second link (e.g., 130) having a first end (e.g., 142) pivotally coupled to the second end of the first link, the first end of the second link defining a second one of the bearing surfaces (e.g., 118*b*), and a second end (e.g., 146) pivotally coupled to the first end of the arm. In some methods, when the arm is in the deployed position, the pivot point (e.g., 150) between the first and second links is disposed above a line (e.g., 154) that extends between the pivot point (e.g., 158) between the first link and the base and the pivot point (e.g., 162) between the second link and the arm. In some methods, a distance from the pivot point between the first link and the base to the pivot point between the first and second links is greater than a distance between the pivot point between the first and second links and the pivot point between the second link and the first end of the arm. In some methods, when the arm is in the stowed position, the first and second links are each substantially parallel to the plane.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A floor-standing apparatus comprising:
- a base including a bottom surface that lies in a plane; and
- a first arm having:
  - a first end that is pivotally coupled to the base via a hinge such that the arm is movable relative to the base between a stowed position in which the first end of the arm is substantially parallel to the plane and a deployed position in which the first end of the arm is substantially perpendicular to the plane; and
  - a second end;
- wherein movement of the arm to the deployed position moves the hinge, or enables movement of the hinge:
  - to an engaged position in which the hinge prevents movement of the arm from the deployed position toward the stowed position; and
  - from a disengaged position in which the hinge permits movement of the arm toward and away from the stowed position; and
- wherein the hinge comprises a linkage that is coupled between the base and the first end of the arm, the linkage including:
  - a first link having:
    - a first end pivotally coupled to the base; and
    - a second end; and
  - a second link having:
    - a first end pivotally coupled to the second end of the first link; and
    - a second end pivotally coupled to the first end of the arm.

2. The apparatus of claim 1, wherein, when the arm is in the deployed position and the hinge is in the engaged position, the hinge prevents movement of the arm from the deployed position and away from the stowed position.

3. The apparatus of claim 1, wherein, when the arm is in the deployed position, the pivot point between the first and second links is disposed above a line that extends between the pivot point between the first link and the base and the pivot point between the second link and the first end of the arm.

4. The apparatus of claim 1, wherein a distance from the pivot point between the first link and the base to the pivot point between the first and second links is greater than a distance between the pivot point between the first and second links and the pivot point between the second link and the arm.

5. The apparatus of claim 1, wherein, when the arm is in the stowed position, the first and second links are each substantially parallel to the plane.

6. The apparatus of claim 1, wherein the hinge is only in or movable to the engaged position when the arm is in the deployed position.

7. The apparatus of claim 1, wherein the arm has a length, measured between the first and second ends of the arm, that is from 40 to 50 inches.

8. The apparatus of claim 1, wherein the base has a weight that is from 10 to 15 pounds.

9. The apparatus of claim 1, wherein the base has a length that is from 10 to 15 inches.

10. The apparatus of claim 1, comprising a second arm having:

a first end that is pivotally coupled to the second end of the first arm; and a second end.

11. A method for positioning a floor-standing apparatus, the method comprising:

moving an elongated arm of a floor-standing apparatus having a first end that is pivotally coupled via a hinge to a base of the apparatus and a second end:

from a stowed position in which the first end of the arm is substantially parallel to a plane defined by a bottom surface of the base; and to a deployed position in which the first end of the arm is substantially perpendicular to the plane; and moving the hinge to:

an engaged position in which the hinge prevents movement of the arm from the deployed position and toward the stowed position; and from a disengaged position in which the hinge permits movement of the arm toward and away from the stowed position;

wherein the hinge comprises a linkage that is coupled between the base and the first end of the arm, the linkage including:

a first link having:

a first end pivotally coupled to the base; and a second end; and a second link having:

a first end pivotally coupled to the second end of the first link; and a second end pivotally coupled to the first end of the arm.

12. The method of claim 11, wherein movement of the arm to the deployed position moves the hinge to the engaged position.

13. The method of claim 11, wherein, when the arm is in the deployed position and the hinge is in the engaged position, the hinge prevents movement of the arm from the deployed position and away from the stowed position.

14. The method of claim 11, wherein, when the arm is in the deployed position, the pivot point between the first and second links is disposed above a line that extends between the pivot point between the first link and the base and the pivot point between the second link and the arm.

15. The method of claim 11, wherein a distance from the pivot point between the first link and the base to the pivot point between the first and second links is greater than a distance between the pivot point between the first and second links and the pivot point between the second link and the first end of the arm.

16. The method of claim 11, wherein, when the arm is in the stowed position, the first and second links are each substantially parallel to the plane.

17. The method of claim 11, wherein the hinge is only in or movable to the engaged position when the arm is in the deployed position.

* * * * *